United States Patent
Tang et al.

(10) Patent No.: US 9,997,197 B2
(45) Date of Patent: Jun. 12, 2018

(54) METHOD AND DEVICE FOR CONTROLLING PLAYBACK

(71) Applicant: Xiaomi Inc., Beijing (CN)

(72) Inventors: Mingyong Tang, Beijing (CN); Huayijun Liu, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 14/986,838

(22) Filed: Jan. 4, 2016

(65) Prior Publication Data

US 2016/0293210 A1 Oct. 6, 2016

(30) Foreign Application Priority Data

Mar. 31, 2015 (CN) .......................... 2015 1 0149205

(51) Int. Cl.
*H04N 9/80* (2006.01)
*G11B 27/00* (2006.01)
*G11B 27/10* (2006.01)
*G06F 3/01* (2006.01)
*G06K 9/00* (2006.01)
*G06T 7/20* (2017.01)

(52) U.S. Cl.
CPC ............ *G11B 27/005* (2013.01); *G06F 3/012* (2013.01); *G06F 3/013* (2013.01); *G06K 9/00718* (2013.01); *G06K 9/00744* (2013.01); *G06T 7/20* (2013.01); *G11B 27/105* (2013.01)

(58) Field of Classification Search
CPC ...... H04N 5/85; H04N 9/8042; G11B 27/105; G11B 27/329; G11B 2220/2562
USPC ......................................................... 386/248
See application file for complete search history.

(56) References Cited

U.S. PATENT DOCUMENTS

| | | | |
|---|---|---|---|
| 8,235,529 B1 | 8/2012 | Raffle et al. | |
| 2007/0201817 A1* | 8/2007 | Peker | G06F 17/30787 |
| | | | 386/329 |
| 2011/0064384 A1 | 3/2011 | Otani | |
| 2013/0148940 A1 | 6/2013 | Schmit et al. | |
| 2013/0202158 A1 | 8/2013 | Nakao et al. | |
| 2013/0257690 A1 | 10/2013 | Fujimaki | |
| 2014/0285482 A1* | 9/2014 | Kim | G06T 13/40 |
| | | | 345/419 |

(Continued)

FOREIGN PATENT DOCUMENTS

| | | |
|---|---|---|
| CN | 101600107 A | 12/2009 |
| CN | 102036054 | 4/2011 |
| CN | 103248808 A | 8/2013 |

(Continued)

OTHER PUBLICATIONS

International Search Report and Written Opinion of PCT/CN2015/088689, mailed from the State Intellectual Property Office of China dated Dec. 25, 2015.

(Continued)

*Primary Examiner* — William C Vaughn, Jr.
*Assistant Examiner* — Daniel Tekle
(74) *Attorney, Agent, or Firm* — Finnegan, Henderson, Farabow, Garrett & Dunner LLP

(57) ABSTRACT

A method for a device to control playback, includes: obtaining a video file; determining a vision field of a user: and selecting, from the vision file, a video clip corresponding to the vision field of the user and playing back the video clip.

13 Claims, 21 Drawing Sheets

(56) References Cited

U.S. PATENT DOCUMENTS

| | | | | |
|---|---|---|---|---|
| 2015/0092050 A1* | 4/2015 | Cho | ................... | A61B 5/7405 348/143 |
| 2015/0294450 A1* | 10/2015 | Eyring | ................ | G02B 27/017 382/110 |

FOREIGN PATENT DOCUMENTS

| | | |
|---|---|---|
| CN | 103543831 A | 1/2014 |
| CN | 104133648 A | 11/2014 |
| CN | 104702919 A | 6/2015 |
| CN | 104735385 A | 6/2015 |
| GB | 2494940 A | 3/2013 |
| JP | 2011-066609 A | 3/2011 |
| JP | 2013-077013 A | 4/2013 |
| JP | 2013-162333 A | 8/2013 |
| JP | 2014-123853 A | 7/2014 |
| KR | 10-2015-0001425 A | 1/2015 |
| RU | 2010132152 A | 3/2013 |
| RU | 138628 U1 | 3/2014 |
| WO | WO 2014/198552 A1 | 12/2014 |
| WO | WO-2014/199155 A1 | 12/2014 |

OTHER PUBLICATIONS

Extended European Search Report of European Patent Application No. 16160297.4, from the European Patent Office, dated Aug. 23, 2016.

Office Action for Korean Application No. 10-2016-7001754, mailed from the Korean Intellectual Property Office, dated Dec. 13, 2016.

Office Action—Notification of Reasons for Refusal for Japanese Application No. 2017-508738, dated Jun. 8, 2017.

Office Action and Search Report issued in Russian Application No. 2016102791/08 (004111), mailed from Russian Federal Service for Intellectual Property, dated Feb. 13, 2017.

* cited by examiner

METHOD AND DEVICE FOR CONTROLLING PLAYBACK

CROSS-REFERENCE TO RELATED APPLICATIONS

This application is based on and claims priority to Chinese Patent Application No. 201510149205.0, filed Mar. 31, 2015, the entire contents of all of which are incorporated herein by reference.

FIELD

The present disclosure relates to the field of wearable device technology and, more particularly, to a method and a device for controlling playback.

BACKGROUND

With the development of science and technology, more and more wearable devices have appeared, such as smart bracelets, smart glasses, and the like. Hence, a problem to be solved is how to utilize hardware features of the wearable devices to facilitate people's daily life.

SUMMARY

According to a first aspect of the present disclosure, there is provided a method for a device to control playback, the method comprising: obtaining a video file; determining a vision field of a user; and selecting, from the vision file, a video clip corresponding to the vision field of the user and playing back the video clip.

According to a second aspect of the present disclosure, there is provided a device, comprising: a processor; and a memory configured to store instructions executable by the processor; wherein the processor is configured to: obtain a video file; determine a vision field of a user; and select, from the video file, a video clip corresponding to the vision field of the user and play back the video clip.

According to a third aspect of the present disclosure, there is provided a non-transitory computer-readable storage medium having stored therein instructions that, when executed by a processor of a device, cause the device to perform a method for controlling playback, the method comprising: obtaining a video file; determining a vision field of a user; and selecting, from the video file, a video clip corresponding to the vision field of the user and playing back the video clip.

It is to be understood that both the foregoing general description and the following detailed description are illustrative and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Figure 1:
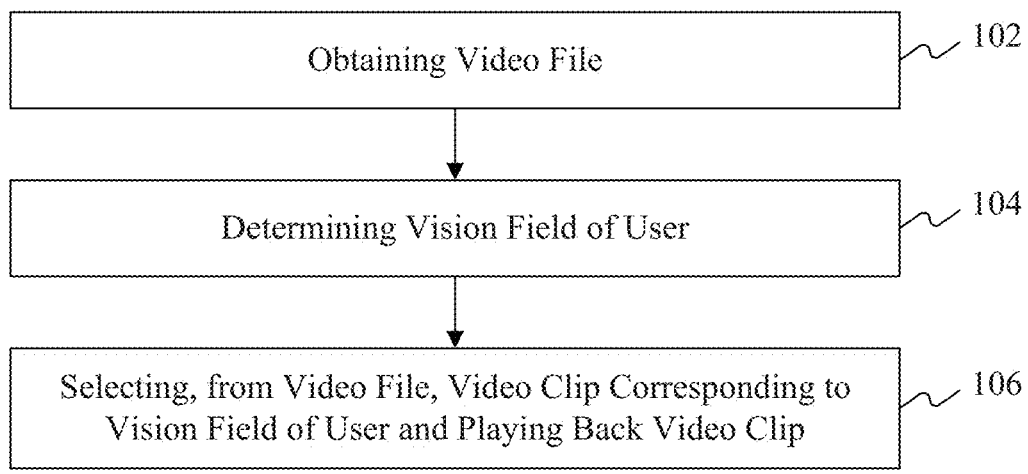
FIG. 1 is a flowchart of a method for controlling playback, according to an exemplary embodiment.

FIG. 1 is a flowchart of a method 100 for controlling playback, according to an illustrative embodiment. For example, the method 100 may be used for a wearable device. Referring to FIG. 1, method 100 may include the following steps.

In step 102, the wearable device obtains a video file.

For example, the wearable device may be smart glasses, and can automatically determine whether to playback the video file at a variable speed, by shooting a subject along with conditional judgment, so as to optimize a viewing process of a user.

Figure 2:
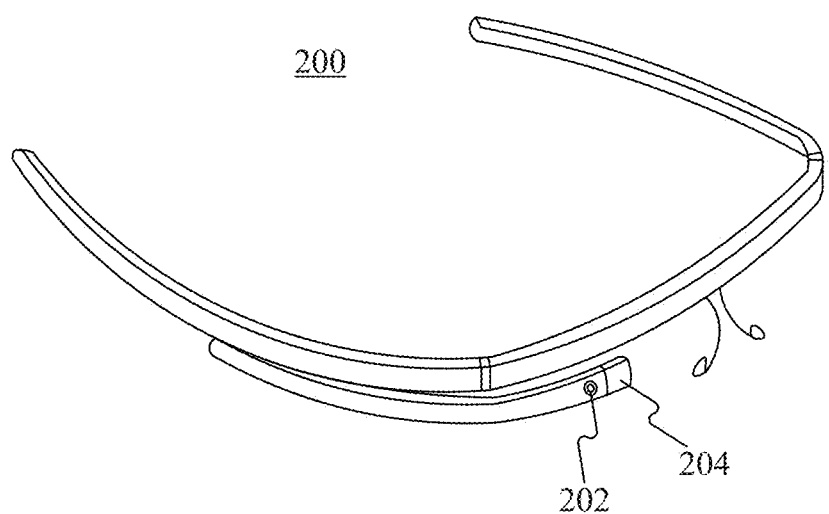
FIG. 2 is a schematic diagram of a pair of smart glasses, according to an exemplary embodiment.

In one exemplary embodiment, the subject may be shot directly by the smart glasses. FIG. 2 is a schematic diagram of a pair of smart glasses 200, according to an exemplary embodiment. Referring to FIG. 2, the smart glasses 200 are equipped with a camera 202 and a displaying screen 204. The smart glasses 200 can directly invoke its own camera 202 to shoot a video of the subject, and play back the video at the variable speed on the displaying screen 204 when it is judged that the subject satisfies a condition of variable speed playback.

Figure 3:
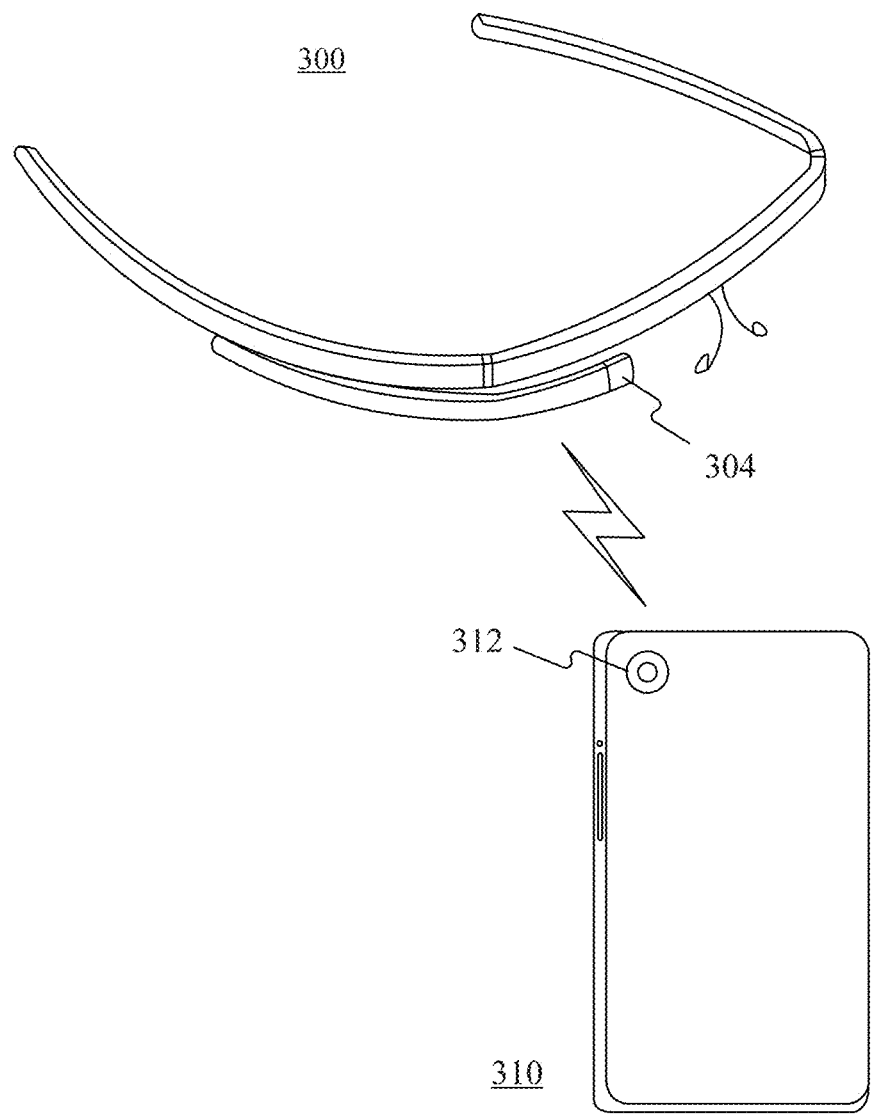
FIG. 3 is a schematic diagram of a pair of smart glasses and a smart phone, according to an exemplary embodiment.

In another illustrative embodiment, the smart glasses may cooperate with another device, such as a smart phone, for shooting a subject. FIG. 3 is a schematic diagram illustrating a pair of smart glasses 300 and a smart phone 310, according to an exemplary embodiment. As shown in FIG. 3, the smart glasses 300 are not provided with any camera, but are provided with a displaying screen 304. In such a case, a camera 312 of the smart phone 310 may shoot a video of a subject, and the smart glasses 300 may obtain the video file from the smart phone 310. As still another exemplary embodiment, the smart glasses are equipped with a camera, but another device equipped with a better camera, such as a smart phone, may shoot the video and then transmit the video file to the smart glasses to realize the variable speed playback.

The video file may be transmitted between the smart glasses and the smart phone using any wireless or wired manners, such as Bluetooth. The present disclosure does not limit the transmission manner.

Moreover, the present disclosure uses the smart glasses for illustration purpose only. It is contemplated that the technical solution provided by the present disclosure may be applied to other non-wearable electronic devices, so long as the electronic devices are capable of processing information and displaying images (e.g., a displaying screen), and are capable of identifying the vision field of a user and selecting a video clip for playing back based on the vision field.

In step 104, the wearable device determines a vision field of a user.

Figure 4:
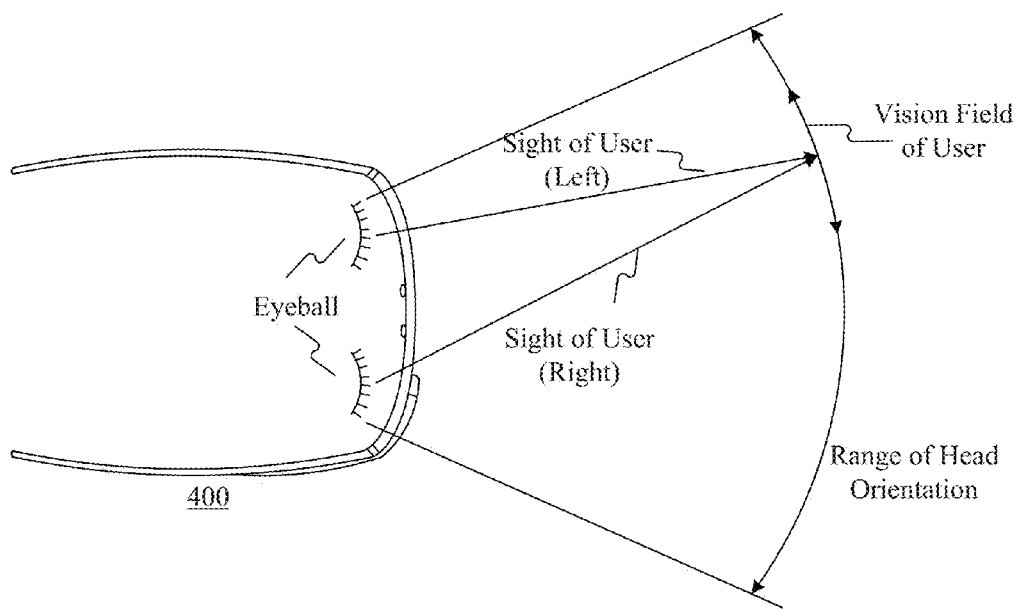
FIG. 4 is a schematic diagram of determining a vision field of a user, according to an exemplary embodiment.

The wearable device may determine the vision field of the user according to an obtained head orientation and eyeball motion state of the user. FIG. 4 is a schematic illustration of determining a vision field of a user by a pair of smart glasses 400, according to an exemplary embodiment. Referring to FIG. 4, the camera of the smart glasses 400 is able to rotate together with the head of the user, so as to form a range of head orientation. The range of head orientation is the largest vision field that the user can see at the current head orientation. Further, by obtaining the eyeball motion state of the user, the smart glasses 400 may locate the viewing focus of the left and right eye sights, and take the visible region near the viewing focus as the vision field of the user.

In step 106, the wearable device selects from the video file a video clip corresponding to the vision field of the user and plays back the selected video clip.

In this embodiment, by determining the vision field of the user, the wearable device may vary played video content as the user turns the head to adjust the vision field. In this exemplary manner, the wearable device may facilitate detailed observation of each motion stage of the subject, so as to provide an improved viewing experience.

In this embodiment, the wearable device may play back the video clip directly without adjusting the playback speed and the played picture. Alternatively, the wearable device may adjust the playback process of the video clip for optimization, which will be described below in connection with exemplary embodiments.

1. Variable Speed Playback

Sometimes, the motion of the subject in the video clip may not be suitable for the user to watch. For example, the motion intensity of the subject may be too high for the user to view carefully, or may be too low for the user to view smoothly. To solve these problems and optimize the viewing experience, the wearable device may playback the video clip at a variable speed.

Therefore, the wearable device may judge or predict the motion intensity of the subject in the following ways, so as to determine whether the variable speed playback is needed, and how to perform the variable speed playback.

1.1 Based on Motion Feature Parameters

1) Motion Speed

In exemplary embodiments, two conditions, too fast and too slow, exist in terms of the motion speed, and here the condition of "too fast" is taken as an example for describing the process of determining the motion intensity of the subject. The visual persistence time (t) of human eyes generally lasts about 0.1 to 0.4 seconds. When the motion speed of the subject is too high, the motion duration of the subject in the vision field of a user may be less than t. As a result, the user may not view or identify the subject.

Therefore, in order to ensure that the motion intensity of the subject is within a preset intensity range, such that the user may identify and normally view the subject, the duration from the subject entering the vision field of the user to leaving the vision field of the user should generally be longer than t.

Figure 5:
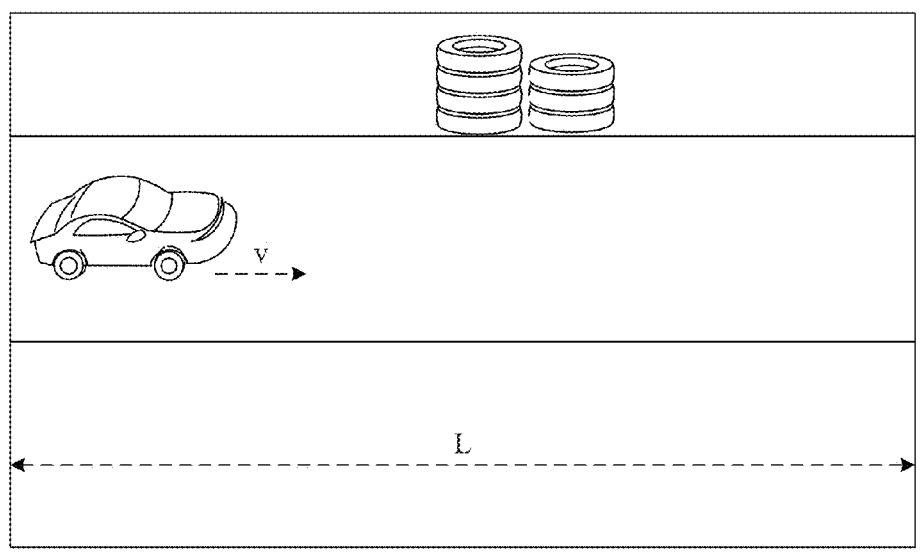
FIGS. 5-8 are schematic diagrams of video images, according to various exemplary embodiments.

In order to meet the above requirement regarding the duration, the actual motion speed of the subject and the shooting distance of the subject should be taken into consideration. For instance, FIG. 5 is a schematic diagram illustrating a video image of a car racing, according to an exemplary embodiment. The video image in FIG. 5 represents a vision field of a user watching the car racing. As illustrated in FIG. 5, the actual motion speed of the car is v, and the actual length of the motion track in the vision field of the user considering the current shooting distance of the car (i.e., the distance between the camera and the car) is L. Therefore, the duration of the car passing the vision field of the user is T=L/v. Only if T>t, the user can clearly watch the motion of the car. Accordingly, in the case of the shooting distance and the vision field of the user shown in FIG. 5, an upper boundary value of the preset intensity range (equivalent to a preset speed range herein) is L/t. That is, the user may clearly view the motion of the car, as long as the actual motion speed v of the car is less than L/t. Otherwise, the video file should be played back slowly at a reduced playback speed.

Figure 6:
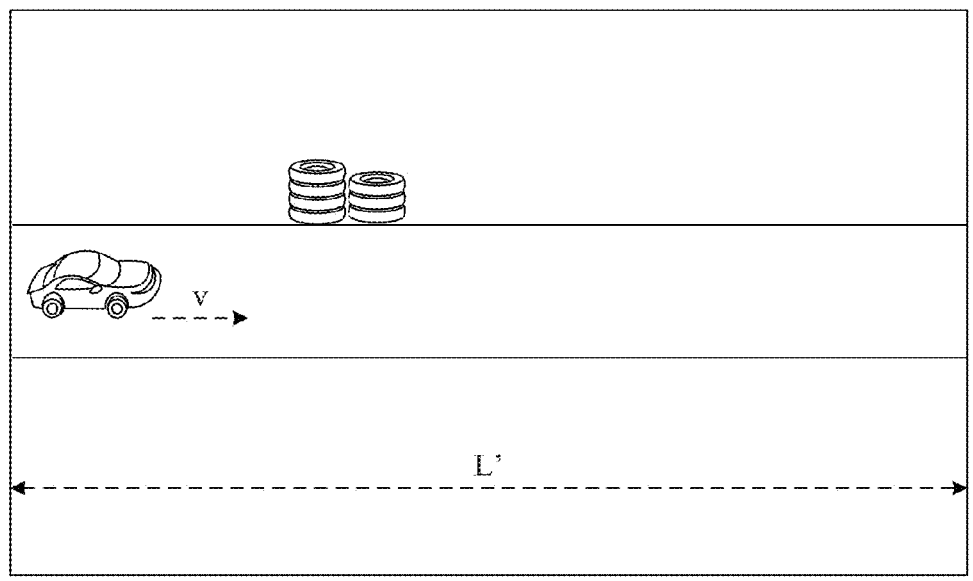

FIG. 6 is a schematic diagram of another video image of a car racing, when the shooting distance of the car increases, according to an exemplary embodiment. The video image in FIG. 6 represents a vision field of the user watching the car racing. As shown in FIG. 6, the actual length of the motion track of the car in the vision field of the user increases to L', and thus the upper boundary value of the preset intensity range increases to L'/t. That is, the user may clearly view the motion of the car, as long as the actual motion speed v of the car is less than L'/t. Otherwise, the video file should be played back slowly at a reduced playback speed.

2) Motion Frequency

In exemplary embodiments, two conditions, too fast and too slow, exist in terms of the motion frequency, and here the condition of "too fast" is taken as an example for describing the process of determining the motion intensity of the subject. Since the visual persistence time (t) of human eyes generally lasts about 0.1 to 0.4 seconds, if the motion frequency of the subject in the vision field of the user is greater than F=25 times per second, the user may not view or identify the subject.

Figure 7:
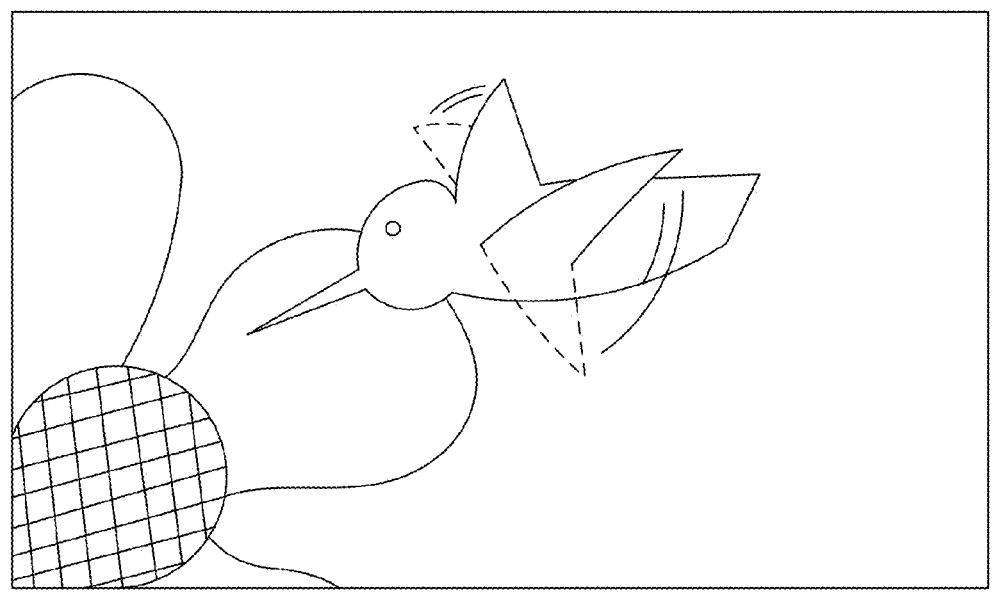

For instance, FIG. 7 is a schematic diagram of a video image of a hummingbird flying, according to an exemplary embodiment. The video image in FIG. 7 represents a vision field of a user observing the hummingbird flying. In the entire observation process, the hummingbird may remain in the vision field of the user. But the user may still not normally observe the flying process of the hummingbird because the frequency of the hummingbird flapping wings usually exceeds 50 times per second, or even reaches hundreds of times per second. It is assumed that the motion frequency of the subject (the hummingbird) flapping wings is f. When f is greater than F, it is determined that the motion intensity goes beyond a preset intensity range (equivalent to a preset frequency range herein, and F being the upper boundary value of the preset frequency range), and the video file needs to be played back slowly to optimize the user's viewing experience.

It shall be noted that the condition of "too fast" is taken as example for illustration of the motion speed and the motion frequency; similarly, the preset intensity range may have a lower boundary value. That is, when the motion speed or motion frequency is lower than the lower boundary value, it is determined that the motion intensity is too low and the video file needs to be played back fast at an increased playback speed to optimize the viewing experience. When the lower boundary value is set in terms of the motion speed, the lower boundary value is in positive correlation with the shooting distance.

Figure 8:
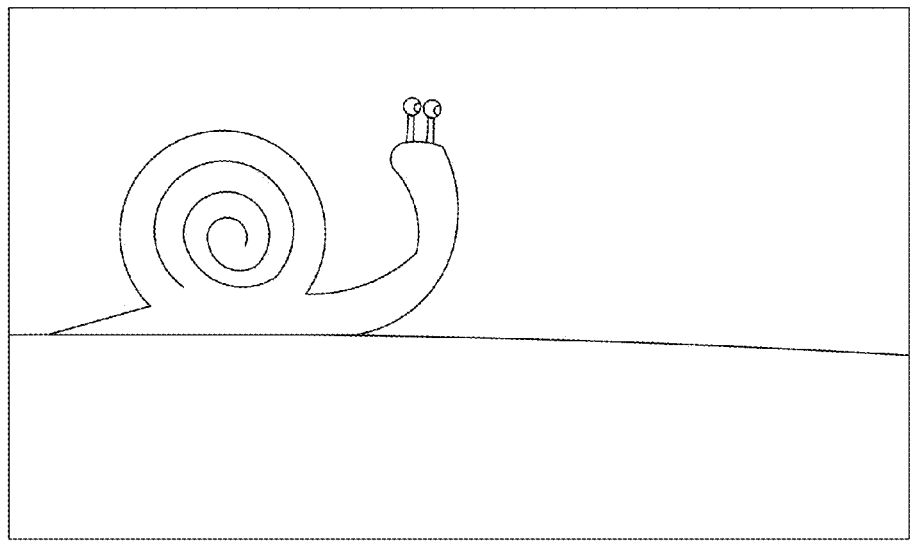

For instance, FIG. 8 is a schematic diagram of a video image of a snail crawling, according to an exemplary embodiment. The video image in FIG. 8 represents a vision field of a user viewing the snail crawling. It may take tens of minutes for the snail to pass the vision field of the user, which may be too slow for overall viewing and evaluation of the entire motion process. Consequently, the crawling process of the snail may be played back fast, such that the user finishes watching the entire crawling process in a short time for better viewing of the motion track and motion of the snail.

1.2 Based on Shooting Scenes

The smart glasses may identify a shooting scene of the video file according to a type of the subject or a type of an action performed by the subject, and may determine whether the subject in the video file satisfies the predefined condition of variable speed playback according to whether the shooting scene belongs to a preset variable speed playback scene.

In this embodiment, scenes that need to be played back at variable speeds may be defined in advance as the preset variable speed playback scenes, and the identification feature of each preset variable speed playback scene is set, such as a type of the subject or a type of an action performed by the subject. Hence, the shooting scene of the video file may be determined accordingly.

For example, the car racing shooting scene shown in FIG. 5 may be determined in advance as a shooting scene which needs to be played back slowly, and a feature of a "racing car" and a "driving" action of the car may be defined as identification features of the current shooting scene. If the smart glasses identify that the subject of a current shooting scene is a racing car and the car is in a driving status, the smart glasses may determine that the current shooting scene needs to be played back at the variable speed and, more specifically, the current shooting scene needs to be played back slowly.

Similarly, the snail crawling shooting scene shown in FIG. 8 may be determined in advance as a shooting scene which needs to be played back fast, and a feature of a snail may be defined as the identification feature of the current shooting scene. If the smart glasses identify that the subject of a current shooting scene is a snail, the smart glasses may determine that the current shooting scene needs to be played back at the variable speed and, more specifically, the current shooting scene needs to be played back fast.

2. Various Forms of Playback

There are various forms to play back a video file at a variable speed. Several exemplary forms are described in the following, but the present disclosure is not limited thereto.

2.1 Overlapping Playback

From a video image of the video file, play data corresponding to the subject or part of the subject that satisfies the predefined condition of variable speed playback is extracted. Then the extracted play data is played in an overlapping manner when the video file is played back.

Figure 9:
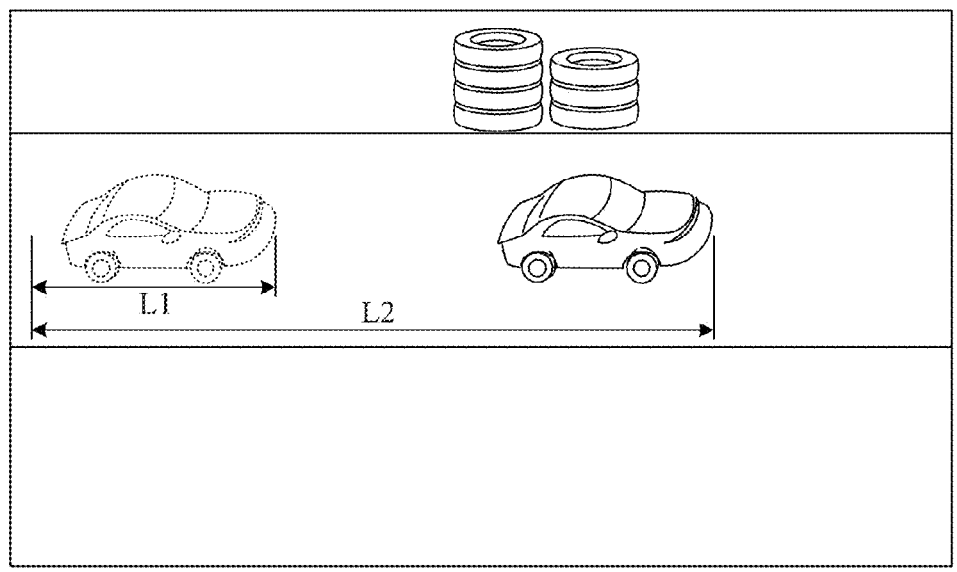
FIGS. 9-13 are schematic diagrams of videos played back at variable speeds, according to various exemplary embodiments.

FIG. 9 is a schematic diagram of a video played back at a variable speed according to an exemplary embodiment. As shown in FIG. 9, the subject of the video is a vehicle. The vehicle in dotted lines at the left side of FIG. 9 represents a picture element extracted from a video image. The picture elements extracted from all of the video images of the video constitute extracted play data. The vehicle in solid lines at the right side of FIG. 9 represents an original picture element in the video file. Hence, in the process of variable speed playback, the left vehicle in dotted lines (i.e. the extracted picture element) is superposed onto and displayed with the video image containing the right vehicle in solid lines, so as to obtain the final display image shown in FIG. 9, which can be played back on the displaying screen of the smart glasses in FIG. 2 or FIG. 3

It may be known from FIG. 9 that due to slow playback, the driving distance of the right vehicle in solid lines is L2 while the driving distance of the left vehicle in dotted lines is only L1, such that the user may view the driving process of the vehicle more clearly.

It should be noted that, as the description of play data corresponding to part of the subject that satisfies the predefined condition of variable speed playback, since not every subject is the same as the vehicle in FIG. 9 which generates intensive motion on the whole, it is possible to determine whether each component of the subject satisfies the predefined condition of variable speed playback, and to play back, at the variable speed, only the component that satisfies the predefined condition of variable speed playback.

Figure 10:
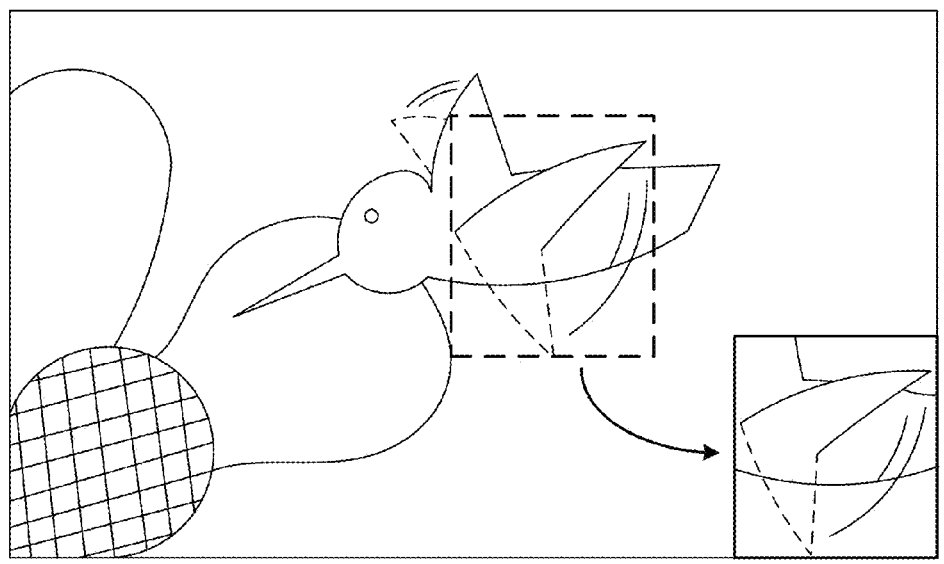

FIG. 10 is a schematic diagram of a video played back at a variable speed according to such an exemplary embodiment. As shown in FIG. 10, when a hummingbird suspends in the air, only the motion frequency of wings is greater than the preset frequency range, and thus the wing region of the hummingbird may be extracted for slow playback. Of course, if the picture element extracted is superposed onto and displayed with the original picture element, without any substantial change in the position of the subject, the wing motion played back slowly may interfere with the original wing motion, which will affect the viewing by the user. In order to solve the problem, the following playback method may be employed.

1) From a video image (e.g., a video frame) of the video file, play data corresponding to the subject or part of the subject that satisfies the predefined condition of variable speed playback is extracted. Then the extracted play data is played in an overlapping manner within a playback region at a preset position when the video file is played back.

For example, as shown in FIG. 10, the preset position may be the lower right corner of the vision field of the user, or any other position, and it should be ensured that the preset position will not block the original picture element. Thus, the user may watch the video file played normally and the extracted play data played back slowly at the preset position simultaneously, so as to realize comparative observation of the both.

2) From the video image of the video file, play data corresponding to the subject or part of the subject that satisfies the predefined condition of variable speed playback is extracted. An original picture element in the video image corresponding to the play data extracted is erased from the video image, so as to obtain a processed video file. The extracted play data is played back in an overlapping manner when the processed video file is played back.

In this embodiment, the original picture element may be directly erased from the video file in order to avoid interference between the extracted picture element extracted and the original picture element, which will not degrade the user viewing experience, since the user expects to see the extracted picture element played back at the variable speed.

2.2 Completely Variable Speed Playback

Figure 11:
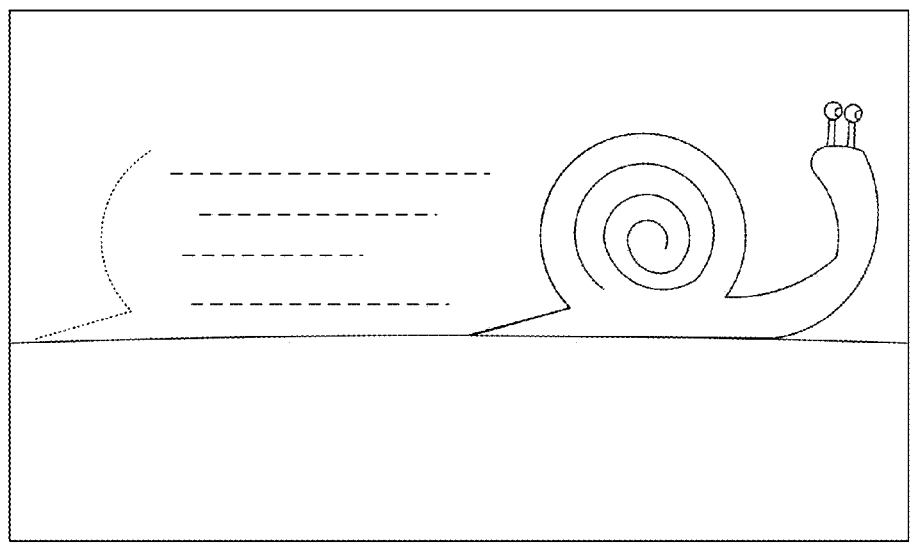

In an exemplary embodiment, a video image containing the subject may be played back completely at the variable speed. FIG. 11 is a schematic diagram of a video played back at a variable speed according to such an exemplary embodiment. As shown in FIG. 11, the video file corresponding to the snail crawling may be directly completely played back fast, which does not need any complicated processing of the video image of the video file.

3. Displaying Motion Tracks

During the playback of the video clip, the wearable device may generate a corresponding motion track based on the motion situation of the subject, and display the motion track in the video image of the video clip.

As an illustrative embodiment, the motion track may be represented as an afterimage of the subject. For example, the wearable device may extract a picture element of the subject from each image of the video clip. The wearable device may superpose the picture elements extracted from all the video images before the current image and then display the superposed picture element.

Figure 12:
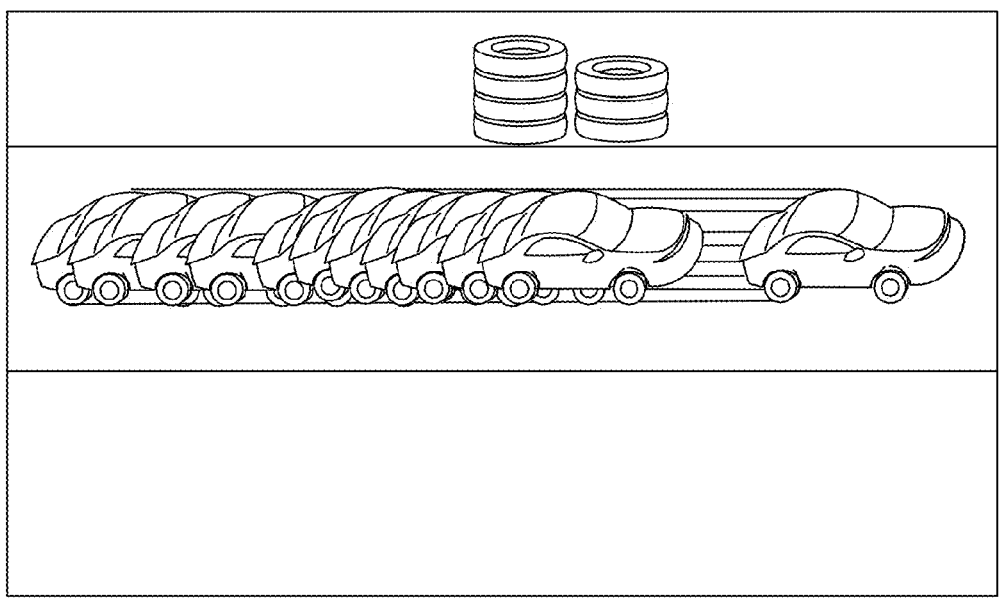

FIG. 12 is a schematic diagram illustrating a motion track displayed by a wearable device, according to an exemplary embodiment. As shown in FIG. 12, supposing that the playback duration of the video clip corresponding to the vision field of the user is 03:20-05:08, at a point of time within the duration, e.g., 04:25, the wearable device may extract and superpose all the vehicle elements in the video images (i.e., the video frames) between 03:20 and 04:25, and display the superposed vehicle elements in the video image of 04:25.

Figure 13:
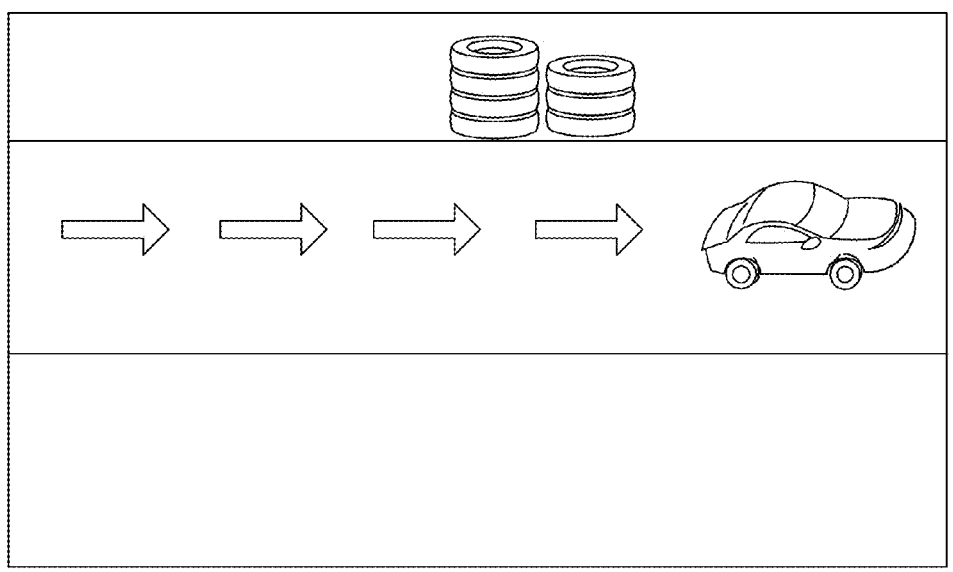

As another illustrative embodiment, the motion track may be represented as a random image identifier, and the corresponding motion track may be displayed by superposing the image identifier on the motion path of the subject. FIG. 13 is a schematic diagram illustrating a motion track displayed by a wearable device, according to an exemplary embodiment. As shown in FIG. 13, the wearable device superposes an identifier of arrow on the driving path of the vehicle for displaying.

By displaying the motion track of the subject during the playback of the video clip, the wearable device may enable the user to know the overall motion status of the subject and thus improve the viewing experience.

The present disclosure further provides an embodiment of a device for controlling playback corresponding to the embodiment of the method for controlling playback.

Figure 14:
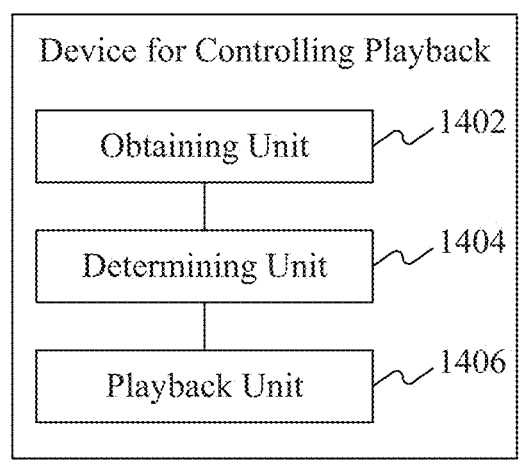
FIG. 14 is a block diagram of a device for controlling playback, according to an exemplary embodiment.

FIG. 14 is a block diagram of a device 1400 for controlling playback, according to an exemplary embodiment. Referring to FIG. 14, the device 1400 may include an obtaining unit 1402, a determining unit 1404, and a playback unit 1406. The obtaining unit 1402 is configured to obtain a video file. The determining unit 1404 is configured to determine a vision field of a user. The playback unit 1406 is configured to select from the video file a video clip corresponding to the vision field of the user, and play back the video clip.

Figure 15:
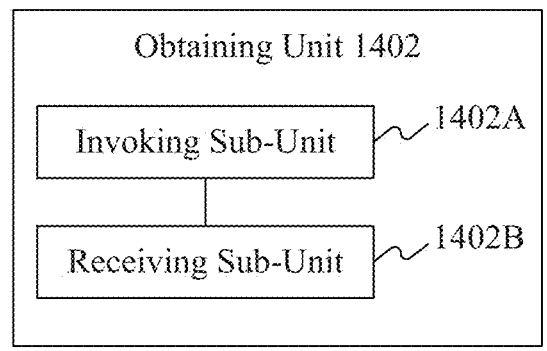
FIG. 15 is a block diagram of an obtaining unit, according to an exemplary embodiment.

FIG. 15 is a block diagram of the obtaining unit 1402 (FIG. 14), according to an exemplary embodiment. The obtaining unit 1402 may include an invoking sub-unit 1402A and a receiving sub-unit 1402B. The invoking sub-unit 1402A is configured to invoke or activate a camera of the device to shoot a subject. The receiving sub-unit 1402B is configured to receive the video file obtained by shooting the subject by a camera of another device.

Figure 16:
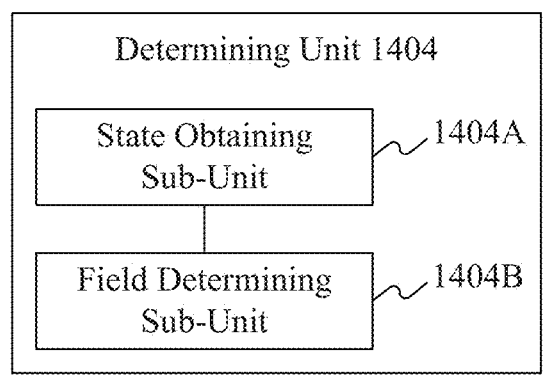
FIG. 16 is a block diagram of a determining unit, according to an exemplary embodiment.

FIG. 16 is a block diagram of the determining unit 1404 (FIG. 14), according to an exemplary embodiment. The determining unit 1404 may include a state obtaining sub-unit 1404A and a field determining sub-unit 1404B. The state obtaining sub-unit 1404A is configured to obtain a head orientation and eyeball motion state of the user. The field determining sub-unit 1404B is configured to determine the vision field of the user according to the head orientation and the eyeball motion state.

Figure 17:
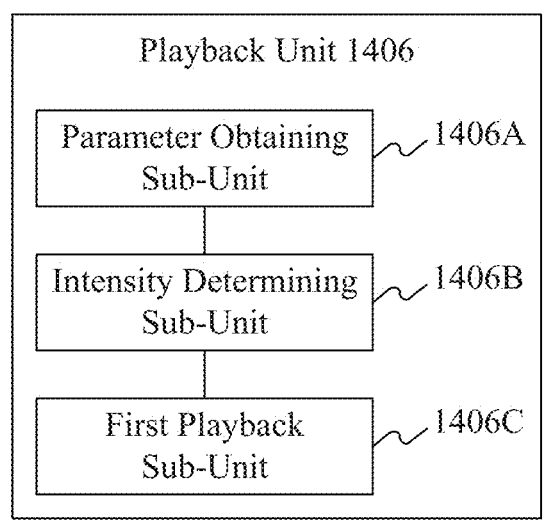
FIG. 17 is a block diagram of a playback unit, according to an exemplary embodiment.

FIG. 17 is a block diagram of the playback unit 1406 (FIG. 14), according to an exemplary embodiment. The playback unit 1406 may include a parameter obtaining sub-unit 1406A, an intensity determining sub-unit 1406B, and a first playback sub-unit 1406C. The parameter obtaining sub-unit 1406A is configured to obtain a motion feature parameter of the subject. The motion feature parameter may include at least one of a motion speed and a motion frequency. The intensity determining sub-unit 1406B is configured to determine whether a motion intensity of the subject belongs to a preset intensity range, according to the motion feature parameter. The first playback sub-unit 1406C is configured to play back the video clip at a variable speed if the motion intensity does not belong to the preset intensity range, and to play back the video clip in a normal manner if the motion intensity belongs to the preset intensity range.

Figure 18:
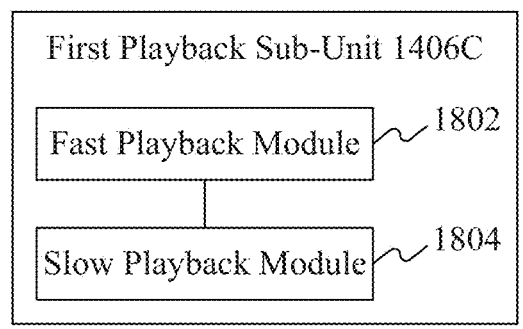
FIG. 18 is a block diagram of a first playback sub-unit, according to an exemplary embodiment.

FIG. 18 is a block diagram of the first playback sub-unit 1406C (FIG. 17), according to an exemplary embodiment. The first playback sub-unit 1406C may include a fast playback module 1802 and a slow playback module 1804. The fast playback module 1802 is configured to play back the video file fast, if a value of the motion feature parameter is smaller than a lower boundary value of the preset intensity range. The slow playback module 1804 is configured to play back the video file slowly, if the value of the motion feature parameter is greater than an upper boundary value of the preset intensity range.

Figure 19:
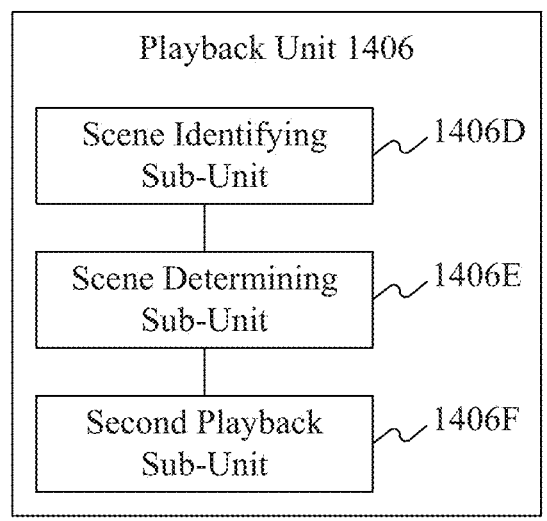
FIG. 19 is a block diagram of a playback unit, according to an exemplary embodiment.

FIG. 19 is a block diagram of the playback unit 1406 (FIG. 14), according to an exemplary embodiment. The playback unit 1406 may include a scene identifying sub-unit 1406D, a scene determining sub-unit 1406E, and a second playback sub-unit 1406F. The scene identifying sub-unit 1406D is configured to identify a shooting scene of a video file according to a type of the subject or a type of an action performed by the subject. The scene determining sub-unit 1406E is configured to determine whether the shooting scene belongs to a preset variable speed playback scene. The second playback sub-unit 1403F is configured to playback the video clip at a variable speed if the shooting scene belongs to the preset variable speed playback scene, to playback the video clip in a normal manner if the shooting scene does not belong to the preset variable speed playback scene.

Figure 20:
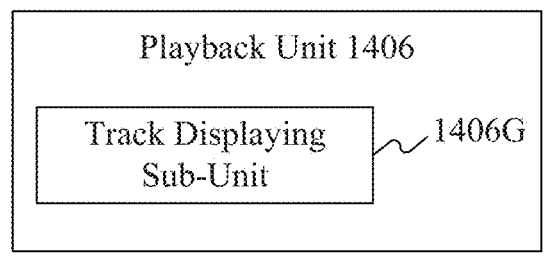
FIG. 20 is a block diagram of a playback unit, according to an exemplary embodiment.

FIG. 20 a block diagram of the playback unit 1406 (FIG. 14), according to an illustrative embodiment. The playback unit 1406 may include a track displaying sub-unit 1406G configured to display a motion track formed in a video image of the video clip of the subject.

With respect to the devices in the above embodiments, the specific manners for performing operations for individual units/modules therein have been described in detail in the embodiments regarding the methods for controlling playback, which will not be elaborated herein.

The device embodiments substantially correspond to the method embodiments. Therefore, relevant description of the device embodiments may be found by referring to the method embodiments. The device embodiments described above are only exemplary, in which the units/modules described as separate components may be or may not be physically separate. One of ordinary skill in the art will understand that the above-described units/modules can each be implemented by hardware, or software, or a combination of hardware and software. The units/modules may be located at the same location or may be distributed at many network elements. In exemplary embodiments, part of or all of the units/modules can be selected to realize the objective of the present disclosure, which may be understood and implemented by those skilled in the art.

In exemplary embodiments, a device for controlling playback is provided. The device comprises a processor and a memory configured to store instruction executable by the processor. The processor is configured to obtain a video file; to determine a vision field of a user; and to select from the video file a video clip corresponding to the vision field of the user and to play back the selected video clip.

Figure 21:
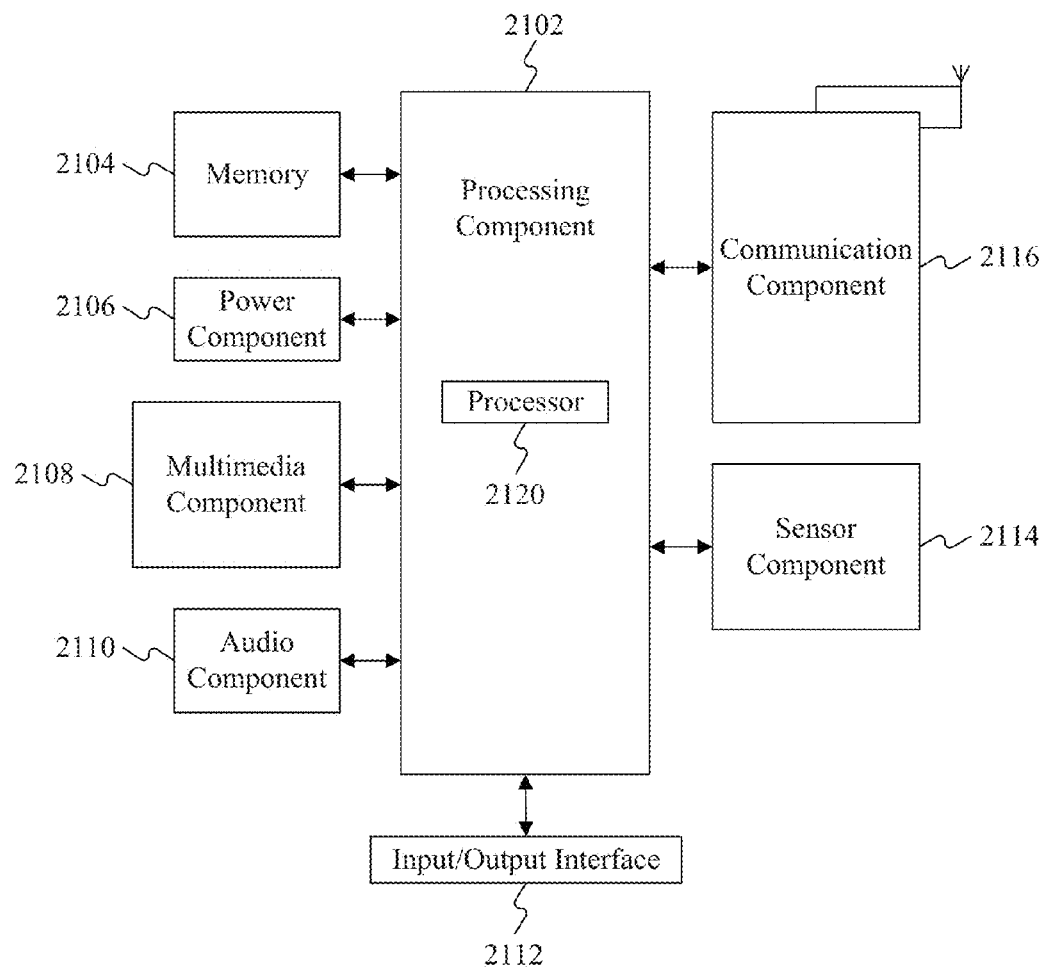
FIG. 21 is a schematic diagram of a device for controlling playback, according to an exemplary embodiment.

FIG. 21 is a block diagram of a device 2100 for controlling playback, according to an exemplary embodiment. For example, the device 2100 may be a mobile phone, a computer, a digital broadcast terminal, a messaging device, a gaming console, a tablet, a medical device, exercise equipment, a personal digital assistant, a wearable device (e.g., smart glasses), and the like.

Referring to FIG. 21, the device 2100 may comprise one or more of the following components: a processing component 2102, a memory 2104, a power component 2106, a multimedia component 2108, an audio component 2110, an input/output (I/O) interface 2112, a sensor component 2114, and a communication component 2116.

The processing component 2102 typically controls overall operations of the device 2100, such as the operations associated with display, telephone calls, data communications, camera operations, and recording operations. The processing component 2102 may comprise one or more processors 2120 to execute instructions to perform all or part of the steps in the above described methods. Moreover, the processing component 2102 may comprise one or more modules which facilitate the interaction between the processing component 2102 and other components. For instance, the processing component 2102 may comprise a multimedia module to facilitate the interaction between the multimedia component 2108 and the processing component 2102.

The memory 2104 is configured to store various types of data to support the operation of the device 2100. Examples of such data comprise instructions for any applications or methods operated on the device 2100, contact data, phonebook data, messages, pictures, video, etc. The memory 2104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2106 provides power to various components of the device 2100. The power component 2106 may comprise a power management system, one or more power sources, and any other components associated with the generation, management, and distribution of power in the device 2100.

The multimedia component 2108 comprises a screen providing an output interface between the device 2100 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2108 comprises a front camera and/or a rear camera. The front camera and the rear camera may receive external multimedia data while the device 2100 is in an operation mode, such as a photographing mode or a video mode. Each of the front camera and the rear camera may be a fixed optical lens system or have focus and optical zoom capability.

The audio component 2110 is configured to output and/or input audio signals. For example, the audio component 2110 comprises a microphone configured to receive an external audio signal when the device 2100 is in an operation mode, such as a call mode, a recording mode, and a voice recognition mode. The received audio signal may be further stored in the memory 2104 or transmitted via the communication component 2116. In some embodiments, the audio component 2110 further comprises a speaker to output audio signals.

The I/O interface 2112 provides an interface between the processing component 2102 and peripheral interface modules, such as a keyboard, a click wheel, buttons, and the like. The buttons may comprise, but are not limited to, a home button, a volume button, a starting button, and a locking button.

The sensor component 2114 comprises one or more sensors to provide status assessments of various aspects of the device 2100. For instance, the sensor component 2114 may detect an open/closed status of the device 2100, relative positioning of components, e.g., the display and the keypad, of the device 2100, a change in position of the device 2100 or a component of the device 2100, a presence or absence of user contact with the device 2100, an orientation or an acceleration/deceleration of the device 2100, and a change in temperature of the device 2100. The sensor component 2114 may comprise a proximity sensor configured to detect the presence of nearby objects without any physical contact. The sensor component 2114 may also comprise a light sensor, such as a CMOS or CCD image sensor, for use in imaging applications. In some embodiments, the sensor component 2114 may also comprise an accelerometer sensor, a gyroscope sensor, a magnetic sensor, a pressure sensor, or a temperature sensor.

The communication component 2116 is configured to facilitate communication, wired or wirelessly, between the device 2100 and other devices. The device 2100 can access a wireless network based on a communication standard, such as WiFi, 2G, 3G, 4G, or a combination thereof. In one illustrative embodiment, the communication component 2116 receives a broadcast signal or broadcast associated information from an external broadcast management system via a broadcast channel In one illustrative embodiment, the communication component 2116 further comprises a near field communication (NFC) module to facilitate short-range communications. For example, the NFC module may be implemented based on a radio frequency identification (RFID) technology, an infrared data association (IrDA)

technology, an ultra-wideband (UWB) technology, a Bluetooth (BT) technology, and other technologies.

In illustrative embodiments, the device 2100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In illustrative embodiments, there is also provided a non-transitory computer-readable storage medium comprising instructions, such as comprised in the memory 2104, executable by the processor 2120 in the device 2100, for performing the above-described methods. For example, the non-transitory computer-readable storage medium may be a read-only memory (ROM), a random access memory (RAM), a CD-ROM, a magnetic tape, a floppy disc, an optical data storage device, and the like.

Other embodiments of the present disclosure will be apparent to those skilled in the art from consideration of the specification and practice of the disclosure disclosed here. This application is intended to cover any variations, uses, or adaptations of the disclosure following the general principles thereof and comprising such departures from the present disclosure as come within known or customary practice in the art. It is intended that the specification and examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for a device to control playback, comprising:
    obtaining, by a processor, a video file from an imaging device;
    determining, by the processor, a vision field of a user;
    selecting, by the processor from the vision file, a video clip corresponding to the vision field of the user;
    determining, by the processor, whether a subject in the selected video clip satisfies a condition for variable speed playback; and
    when it is determined that the subject in the selected video clip satisfies a condition for variable speed playback, playing back, by the processor on a display, the selected video clip at a variable speed; wherein:
    the determining of whether the subject in the selected video clip satisfies the condition for variable speed playback includes:
        obtaining, by the processor, a motion feature parameter of the subject; and
        determining, by the processor, whether a motion intensity of the subject is within a preset intensity range, according to the motion feature parameter; and
    the playing back of the selected video clip at the variable speed includes:
        when it is determined that the motion intensity of the subject is not within the preset intensity range, playing back, by the processor on the display, the selected video clip at the variable speed,
    wherein the playing back of the selected video clip at the variable speed includes:
        when it is determined that the motion intensity of the subject is lower than a lower boundary value of the preset intensity range, playing back, by the processor on the display, the selected video clip at an increased playback speed; and
        when it is determined that the motion intensity of the subject is higher than an upper boundary value of the preset intensity range, playing back, by the processor on the display, the selected video clip at a reduced playback speed, and
    wherein the playing back of the selected video clip at the variable speed includes:
        identifying, by the processor, a shooting scene of the video file according to a type of the subject or a type of an action performed by the subject;
        determining, by the processor, whether the shooting scene is a preset variable speed playback scene; and
        when it is determined that the shooting scene is the preset variable speed playback scene, playing back, by the processor on the display, the selected video clip at the variable speed.

2. The method according to claim 1, wherein the obtaining of the video file includes at least one of:
    invoking the imaging device to shoot a subject, the imaging device being a camera of the device; or
    receiving the video file from a second device, the imaging device being a camera of the second device and configured to shoot the video file.

3. The method according to claim 1, wherein the determining of the vision field of the user includes:
    determining, by the processor, the vision field of the user according to an obtained head orientation of the user and an obtained eyeball motion state of the user.

4. The method according to claim 1, wherein:
    the motion feature parameter includes at least one of a motion speed or a motion frequency, and
    the determining of whether the motion intensity of the subject is within the preset intensity range includes:
        when the motion feature parameter includes the motion speed and the motion speed falls within a preset speed range, determining, by the processor, that the motion intensity of the subject is within the preset intensity range; and
        when the motion feature parameter includes the motion frequency and the motion frequency falls within a preset frequency range, determining, by the processor, that the motion intensity of the subject is within the preset intensity range.

5. The method according to claim 4, wherein a boundary value of the preset speed range is in positive correlation with a distance between the imaging device and the subject.

6. The method according to claim 1, wherein the playing back of the selected video clip at the variable speed includes:
    displaying, by the processor on the display, a motion track in a video image of the selected video clip.

7. A device, comprising:
    a processor; and
    a memory configured to store instructions executable by the processor;
    wherein the processor is configured to:
        obtain a video file;
        determine a vision field of a user;
        select, from the video file, a video clip corresponding to the vision field of the user;
        determine whether a subject in the selected video clip satisfies a condition for variable speed playback; and when it is determined that the subject in the selected video clip satisfies a condition for variable speed playback, play back the selected video clip at a variable speed;

wherein in determining whether the subject in the selected video clip satisfies the condition for variable speed playback, the processor is further configured to:

obtain a motion feature parameter of the subject; and determine whether a motion intensity of the subject is within a preset intensity range, according to the motion feature parameter; and in playing back the selected video clip at the variable speed, the processor is further configured to:

when it is determined that the motion intensity of the subject is not within the preset intensity range, play back, on the display, the selected video clip at the variable speed, wherein the playing back of the selected video clip at the variable speed includes:

when it is determined that the motion intensity of the subject is lower than a lower boundary value of the preset intensity range, playing back the selected video clip at an increased playback speed; and when it is determined that the motion intensity of the subject is higher than an upper boundary value of the preset intensity range, playing back the selected video clip at a reduced playback speed, and wherein the processor is further configured to:

identify a shooting scene of the video file according to a type of the subject or a type of an action performed by the subject;

determine whether the shooting scene is a preset variable speed playback scene; and when it is determined that the shooting scene is the preset variable speed playback scene, play back the selected video clip at the variable speed.

8. The device according to claim 7, wherein the processor is further configured to perform at least one of:

invoking a camera of the device to shoot the video file; or receiving the video file from a second device, the video file being shot by a camera of the second device.

9. The device according to claim 7, wherein the processor is further configured to:

determine the vision field of the user according to an obtained head orientation of the user and an obtained eyeball motion state of the user.

10. The device according to claim 7, wherein the motion feature parameter comprises at least one of a motion speed or a motion frequency, and wherein the processor is further configured to:

when the motion feature parameter includes the motion speed and the motion speed falls within a preset speed range, determine that the motion intensity of the subject is within the preset intensity range; and when the motion feature parameter includes the motion frequency and the motion frequency falls within a preset frequency range, determine that the motion intensity of the subject shot is within the preset intensity range.

11. The device according to claim 10, wherein a boundary value of the preset speed range is in positive correlation with a shooting distance of the subject.

12. The device according to claim 7, wherein the processor is further configured to:

display a motion track in a video image of the selected video clip.

13. A non-transitory computer-readable storage medium having stored therein instructions that, when executed by a processor of a device, cause the device to perform a method for controlling playback, the method comprising:

obtaining a video file;

determining a vision field of a user;

selecting, from the video file, a video clip corresponding to the vision field of the user;

determining whether a subject in the selected video clip satisfies a condition for variable speed playback; and when it is determined that the subject in the selected video clip satisfies a condition for variable speed playback, playing back the selected video clip at a variable speed, wherein:

the determining of whether the subject in the selected video clip satisfies the condition for variable speed playback includes:

obtaining, by the processor, a motion feature parameter of the subject; and determining, by the processor, whether a motion intensity of the subject is within a preset intensity range, according to the motion feature parameter; and the playing back of the selected video clip at the variable speed includes:

when it is determined that the motion intensity of the subject is not within the preset intensity range, playing back, by the processor on the display, the selected video clip at the variable speed, wherein the playing back of the selected video clip at the variable speed includes:

when it is determined that the motion intensity of the subject is lower than a lower boundary value of the preset intensity range, playing back, by the processor on the display, the selected video clip at an increased playback speed; and when it is determined that the motion intensity of the subject is higher than an upper boundary value of the preset intensity range, playing back, by the processor on the display, the selected video clip at a reduced speed, and wherein the playing back of the selected video clip at the variable speed includes:

identifying, by the processor, a shooting scene of the video file according to a type of the subject or a type of an action performed by the subject;

determining, by the processor, whether the shooting scene is a preset variable speed playback scene; and when it is determined that the shooting scene is the preset variable speed playback scene, playing back, by the processor on the display, the selected video clip at the variable speed.

* * * * *